(12) United States Patent  (10) Patent No.: US 7,865,520 B2
Shimizu  (45) Date of Patent: Jan. 4, 2011

(54) PROGRAM AND METHOD FOR FILE ACCESS CONTROL IN A STORAGE SYSTEM

(75) Inventor: Masaaki Shimizu, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 11/055,634

(22) Filed: Feb. 11, 2005

(65) Prior Publication Data

US 2005/0251508 A1   Nov. 10, 2005

(30) Foreign Application Priority Data

May 10, 2004  (JP)  ............................. 2004-139471

(51) Int. Cl.
    *G06F 17/30*   (2006.01)
(52) U.S. Cl. .................................. 707/781
(58) Field of Classification Search ........................ None
    See application file for complete search history.

(56) References Cited

U.S. PATENT DOCUMENTS

| | | | | |
|---|---|---|---|---|
| 5,548,724 | A * | 8/1996 | Akizawa et al. ............. | 709/203 |
| 5,603,003 | A * | 2/1997 | Akizawa et al. ............. | 711/114 |
| 5,628,007 | A * | 5/1997 | Nevarez ....................... | 707/102 |
| 5,987,506 | A * | 11/1999 | Carter et al. ................ | 709/213 |
| 6,101,558 | A | 8/2000 | Utsunomiya et al. | |
| 6,275,898 | B1 * | 8/2001 | DeKoning ................... | 711/114 |
| 6,928,459 | B1 * | 8/2005 | Sawdon et al. ............. | 707/205 |
| 7,013,364 | B2 * | 3/2006 | Honda et al. ................ | 711/114 |
| 7,103,740 | B1 * | 9/2006 | Colgrove et al. ............ | 711/162 |
| 7,356,660 | B2 * | 4/2008 | Matsunami et al. ......... | 711/165 |
| 2002/0078239 | A1 * | 6/2002 | Howard et al. .............. | 709/245 |
| 2002/0138559 | A1 * | 9/2002 | Ulrich et al. ................ | 709/203 |
| 2003/0120601 | A1 * | 6/2003 | Ouye et al. ................... | 705/51 |
| 2003/0158893 | A1 * | 8/2003 | Komatsu et al. ............ | 709/203 |
| 2004/0083367 | A1 * | 4/2004 | Garg et al. ................... | 713/170 |
| 2005/0203964 | A1 * | 9/2005 | Matsunami et al. ......... | 707/200 |

FOREIGN PATENT DOCUMENTS

JP   2002-1323548   5/2002

* cited by examiner

*Primary Examiner*—Neveen Abel-Jalil
*Assistant Examiner*—Bai D Vu
(74) *Attorney, Agent, or Firm*—Brundidge & Stanger, P.C.

(57) ABSTRACT

In a system having plural storage devices, high-speed file access is obtained by arranging files optimally without the trouble of setting for each file to which storage device the file is allocated. A storage system comprising: nodes coupled to one another via a network; storage devices connected to the nodes; a file attribute detecting module that detects one or more file attributes; a file access rule information storing unit that stores information about one or more file access rules that are associated with the file attribute; and a file access control module that controls access to a file in the storage devices in conformity with the one or more file access rules that are associated with the one or more detected file attributes.

8 Claims, 13 Drawing Sheets

| RULE TYPE 301 | FILE ACCESS RULE ID 302 | FILE ACCESS RULE 303 |
|---|---|---|
| STORAGE AREA ALLOCATION | M_A1 | STORAGE AREAS 4b,4c,4d(range=4b -4d) 304 |
| | M_A2 | TWO ARBITRARY STORAGE AREAS (width=2) 305 |
| | M_A3 | ALL STORAGE AREAS (range= -1) 306 |
| STRIPING METHOD | M_S1 | BLOCK STRIPING (stripe=block) 307 |
| | M_S2 | FILE STRIPING (stripe=file) 308 |
| BLOCK SIZE | M_B1 | BLOCK SIZE 512KB(blocksize=512) 309 |
| | M_B2 | FILE SIZE 2MB(blocksize=2048) 310 |
| ACCESS METHOD | M_M1 | SEQUENTIAL ACCESS (access=sequential) 311 |
| | M_M2 | RANDOM ACCESS (access=random) 312 |
| | M_M3 | FILE CACHING (file_cache=true) 313 |
| | M_M4 | FILE PRE-READING (file_pre_read=true) 314 |

FIG. 3

| ATTRIBUTE TYPE | FILE ATTRIBUTE ITEM ID | ATTRIBUTE PRIORITY (LARGER THE VALUE, HIGHER THE PRIORITY) | FILE ATTRIBUTE ITEM |
|---|---|---|---|
| STATIC FILE ATTRIBUTE | AT1 | 1 | NAME OF DIRECTORY TO WHICH FILE BELONGS |
| | AT2 | 2 | FILE NAME |
| | AT3 | 3 | FILE SIZE |
| | AT4 | 4 | FILE OWNER NAME |
| | AT5 | 5 | FILE OWNER ID |
| DYNAMIC FILE ATTRIBUTE | AT6 | 6 | FILE ACCESS PROGRAM NAME |
| | AT7 | 7 | FILE ACCESS PROCESS ID |
| | AT8 | 8 | FILE ACCESS USER NAME |
| | AT9 | 9 | FILE ACCESS USER NAME ID |
| | AT10 | 10 | FILE ACCESS UNIT |

*FIG. 6*

FILE ATTRIBUTE OF WHEN fft. exe CREATES
/fast_temp/fft. dat (FILE OWNER NAME: yamada)

| FILE ATTRIBUTE ITEM ID | FILE ATTRIBUTE VALUE |
|---|---|
| AT1( NAME OF DIRECTORY TO WHICH FILE BELONGS) | / |
| AT1(NAME OF DIRECTORY TO WHICH FILE BELONGS) | /fast_tmp |
| AT4( FILE OWNER NAME ) | yamada |
| AT6(FILE ACCESS PROGRAM NAME) | fft.exe |

*FIG. 7*

| FILE ATTRIBUTE ITEM ID | FILE ATTRIBUTE VALUE | FILE ACCESS RULE ID |
|---|---|---|
| AT1 ( NAME OF DIRECTORY TO WHICH FILE BELONGS ) | / | M_A3 & M_S2 & M_B1 & M_M2 & M_M3 & M_M4 |
| AT1 ( NAME OF DIRECTORY TO WHICH FILE BELONGS ) | /home | M_B2 |
| AT1 ( NAME OF DIRECTORY TO WHICH FILE BELONGS ) | /fast_tmp | M_A1 & M_S1 & M_B2 & M_M1 & M_M4 |
| AT4 ( FILE OWNER NAME ) | yamada | M_A2 |
| AT6 ( FILE ACCESS PROGRAM NAME ) | fft.exe | M_M1 |
| AT10 ( FILE ACCESS UNIT ) | 2048K - 8192K | M_B2 |

FIG. 8

EXAMPLE OF CREATING ACTUAL ACCESS RULE FOR ACCESS TO
/fast_temp/fft. dat (FILE OWNER NAME: YAMADA) CREATED BY fft. exe

| PRIORITY | FILE ATTRIBUTE ITEM ID | FILE ATTRIBUTE VALUE | ACCESS RULE ID |
|---|---|---|---|
| PRIORITY LOW ↑ ↓ PRIORITY HIGH | AT1 | / | M_A3 & M_S2 & M_B1 & M_M2 & M_M3 & M_M4 |
| | AT1 | /fast_tmp | M_A1 & M_S1 & M_B2 & M_M1 & M_M4 |
| | AT4 | yamada | M_A2 |
| | AT6 | fft.exe | M_M1 |
| CREATED ACTUAL ACCESS RULE → | | | M_M1 & M_A2 & M_S1 & M_B2 & M_M3 & M_M4 |

FIG. 12

PROGRAM AND METHOD FOR FILE ACCESS CONTROL IN A STORAGE SYSTEM

CLAIM OF PRIORITY

The present application claims priority from Japanese application JP2004-139471 filed on May 10, 2004, the content of which is hereby incorporated by reference into this application.

BACKGROUND

This invention relates to a storage system for use in a computer system or the like, and more specifically, to file access control in a file system that has plural storage devices or plural subordinate file systems.

A file system that manages many storage devices has to be high in parallelism of the storage devices and performance of the individual storage devices both in order to push its overall input/output performance to the highest possible level. For instance, in the case of accessing a huge single file, making use of the parallelism of storage devices by dividing the file into blocks, which are allocated to different storage devices to be accessed in parallel, improves the file access performance compared to allocating the whole file to one storage device for access.

However, when the number of storage devices managed by a file system is very large, allocating one file to too many storage devices lowers the performance efficiency of the individual storage devices. This is because, while allocating portions of one file to the same storage device activates the read-ahead/collective write mechanism of the storage devices and thereby improves the performance, dividing a file into so many blocks makes the number of blocks allocated per storage device too small for the read-ahead/collective write mechanism of the storage devices to function fully. In addition, when plural files are accessed simultaneously, blocks of different files are allocated to the same storage device and this causes a seek operation in the storage device, with the result that the performance efficiency of the storage device is lowered even more.

Methods proposed to address the issue of balancing parallelism and performance efficiency include one in which the stripe range of one file is fixed and limited on a file-system basis and one which increases the file access speed by allowing a user to specify, in detail, information on file-to-disk allocation. The latter method allows a user to designate, for each file, disks across which the file is striped, and achieves high-speed access by dividing each file into blocks of the size optimum to the file (see JP 11-15720 A, for example).

Another method proposed allows a file system to choose a file allocation method on a static basis. According to this method, a storage device to which a block size suited to the file access size is set is selected, to thereby reduce the unused storage area and at the same time achieve high-speed access (see JP 2002-132548 A, for example).

SUMMARY

The method that allows a user to specify information on file-to-disk allocation in detail is effective for a routine operation system in which a file, once allocated, is used repeatedly. On the other hand, this method is not practical for the actual running of a system in which many general users create and delete a large number of small-sized files frequently, since a user is required to specify concrete disk allocation information each time he/she creates a file and it is labor-consuming.

The method that allows a file system to choose a file allocation method on a static basis determines to which storage device a file is allocated based on the file access size, which is a fixed condition and makes it impossible to change selection condition and storage device configuration, too. This narrows the range of file size that brings out the highest possible performance of the file system as well as limits the number of files that can be accessed concurrently.

The present invention provides a storage system comprising: nodes coupled to one another via a network; storage devices coupled to the nodes; a file attribute detecting module which detects one or more file attributes; a file access rule information storing unit which stores information about one or more file access rules that are associated with the file attribute; and a file access control module which controls access to a file in the storage devices in conformity with the one or more file access rules that are associated with the detected one or more file attributes.

According to this invention, an allocation method optimum to a file and an access method optimum to the file are automatically selected in conformity with a policy designated by a user. This invention thus makes high-speed file access possible without requiring any laborious work on user's part.

BRIEF DESCRIPTION OF THE DRAWINGS

FIG. 3 is an explanatory diagram of a file access rule table according to the embodiment of this invention.

FIG. 6 is an explanatory diagram of the contents of file attributes according to the embodiment of this invention.

FIG. 7 is an explanatory diagram of examples of file attributes detected by a file attribute detecting module according to the embodiment of this invention.

FIG. 8 is an explanatory diagram of a file access rule selection policy table according to the embodiment of this invention.

FIG. 12 is an explanatory diagram of how a combined file access rule is created according to the embodiment of this invention.

DETAILED DESCRIPTION OF THE PREFERRED EMBODIMENT

An embodiment of this invention will be described in detail below with reference to the accompanying drawings.

Figure 1:
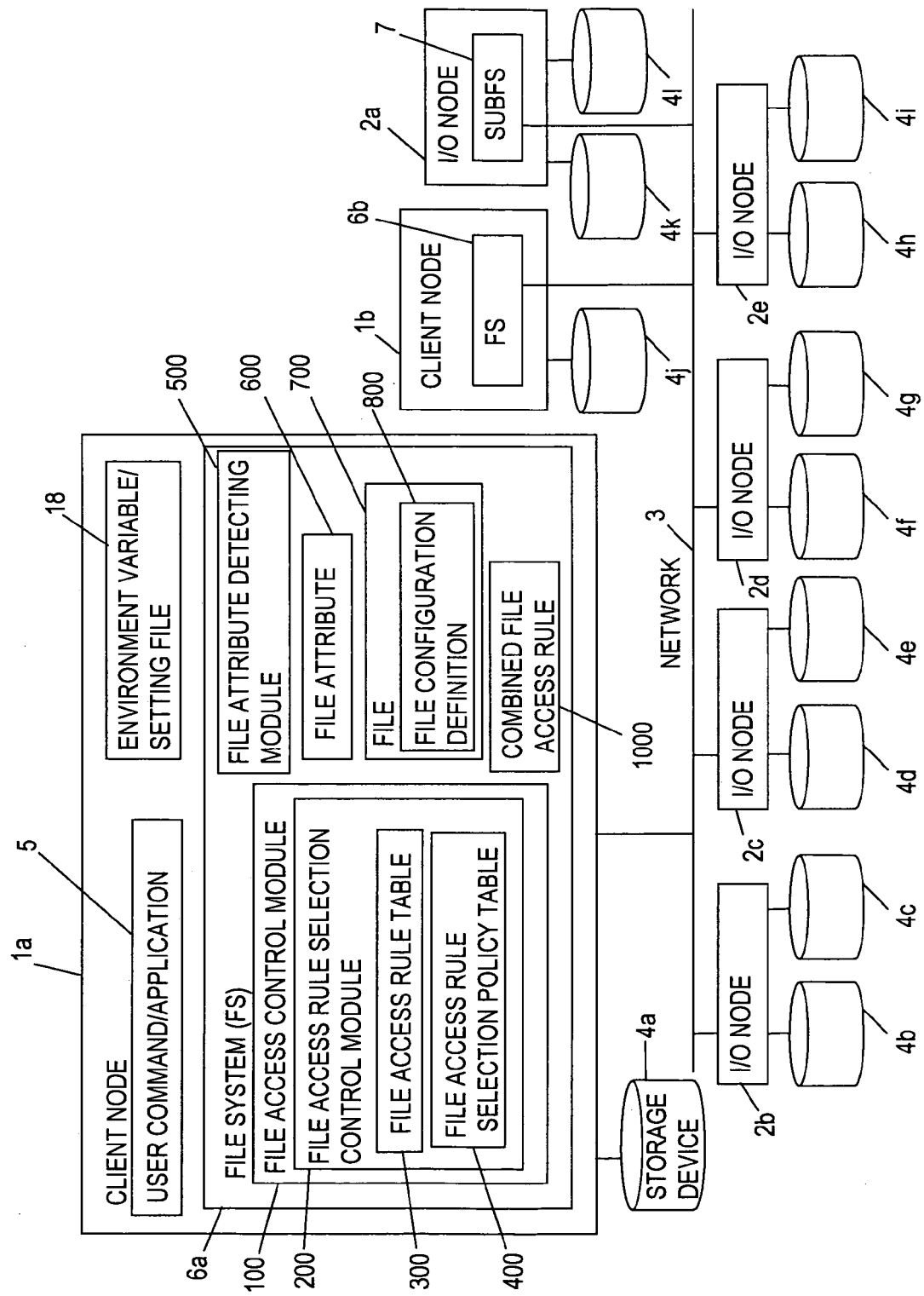
FIG. 1 is a block diagram showing the configuration of a computer system according to an embodiment of this invention.

FIG. 1 is a block diagram showing the configuration of a computer system according to the embodiment of this invention.

Client nodes 1a and 1b are connected via a network 3 to I/O nodes 2a to 2e in a communicable manner. The nodes are connected to storage devices 4a to 4l.

The network 3 is, for example, a LAN (Local Area Network).

The client nodes 1a and 1b are computer devices used by an administrator or user of the system. The client node 1a has a CPU (omitted from the drawing), a memory (omitted from the drawing), and a network interface (omitted from the drawing). A user command/application 5, which is used by the user, an environment variable/setting file 18, to which system attributes and the like are set, and a file system 6a, which is a file management program, are stored in the memory of the client node 1a. One of functions of the user command/application 5 is to issue a file access command to the file system 6a.

The client node 1b has a configuration similar to that of the client node 1a except that it has a file system 6b instead of 6a. The file systems 6a and 6b manage the storage devices connected to the nodes 1a and 1b and 2b to 2e and a sub file system 7 which operates in the I/O node 2a.

The configuration of the file system 6a will be described next.

A file attribute detecting module 500 is composed of a sub-program contained in the file system 6a. Upon receiving a file access command from the user command/application 5, the file attribute detecting module 500 detects a file attribute 600 of a file that is to be accessed as the received command instructs, and sends the detected file attribute 600 to a file access control module 100. The file attribute 600 is constituted of, for example, a file name, a file size, a file owner name and the like as shown in FIGS. 6 and 7.

The file access control module 100 is composed of a sub-program contained in the file system 6a, and includes a file access rule selection control module 200. Receiving the file attribute 600 from the file attribute detecting module 500, the file access control module 100 deliver the file attribute 600 to the file access rule selection control module 200.

The file access rule selection control module 200 is composed of a sub-program contained in the file access control module 100. The file access rule selection control module 200 applies rules in a file access rule table 300 and policies in a file access rule selection policy table 400 to the received file attribute 600 to thereby create a combined file access rule 1000, and sends the combined file access rule 1000 to the file access control module 100. The file access control module 100 creates a configuration definition 800 of a file 700, allocates a file area, and inputs/outputs a file in conformity with the combined file access rule 1000 received.

Figure 4:
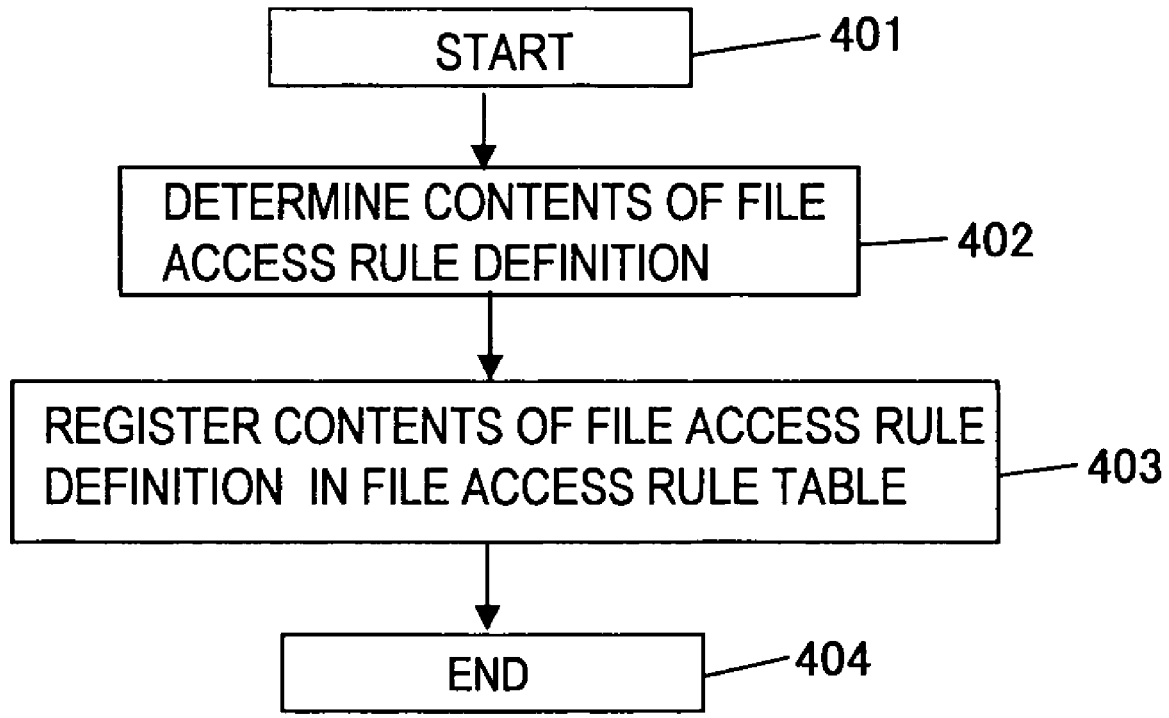
FIG. 4 is a flow chart showing steps of setting file access rules to the file access rule table in the embodiment of this invention.
Figure 5:
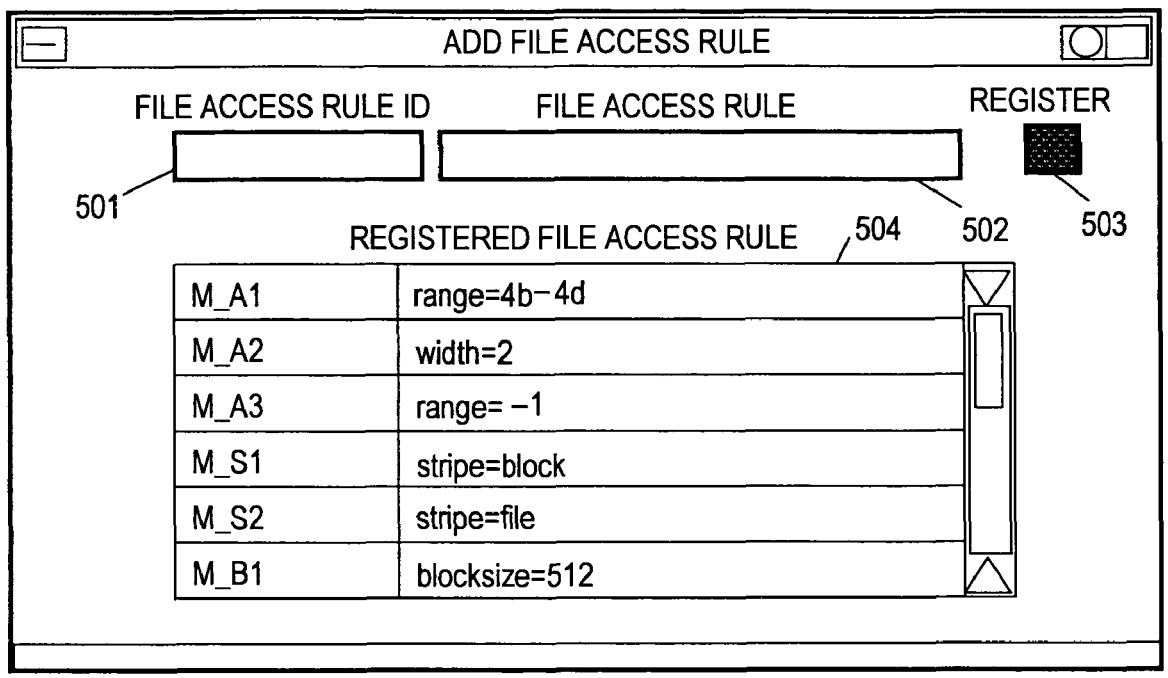
FIG. 5 is an explanatory diagram of an example of a GUI through which file access rules are set to the file access rule table in the embodiment of this invention.

File access rules are rules applied when the client nodes 1 access files, and are defined in advance by the administrator or the user. The file access rule table 300 is a table to store the thus defined file access rules as shown in FIGS. 3 to 5.

Figure 9:
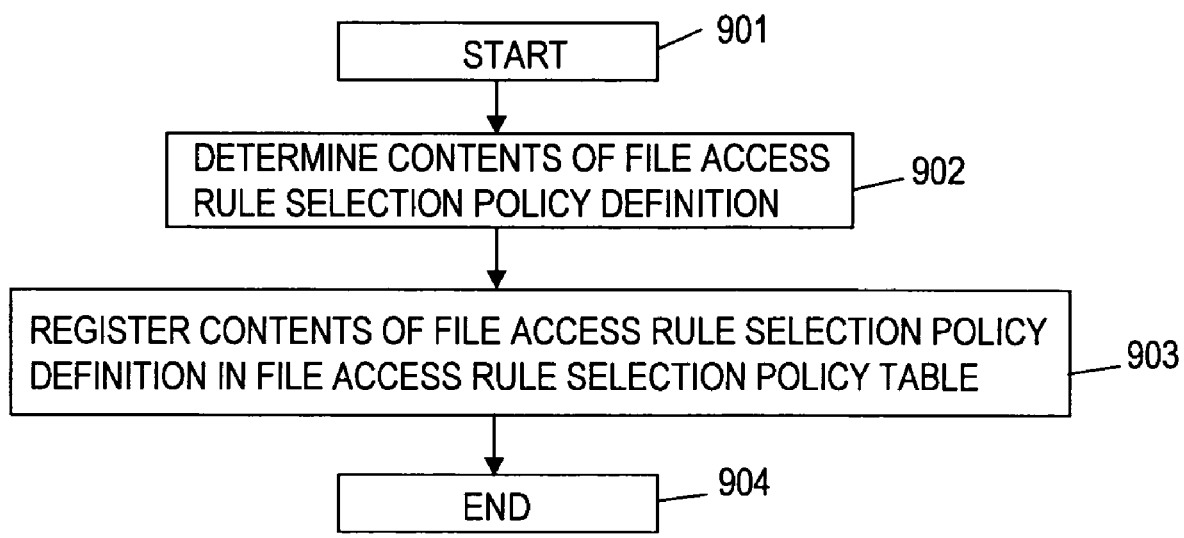
FIG. 9 is a flow chart of steps of setting file access rule selection policies to the file access rule selection policy table in the embodiment of this invention.
Figure 10:
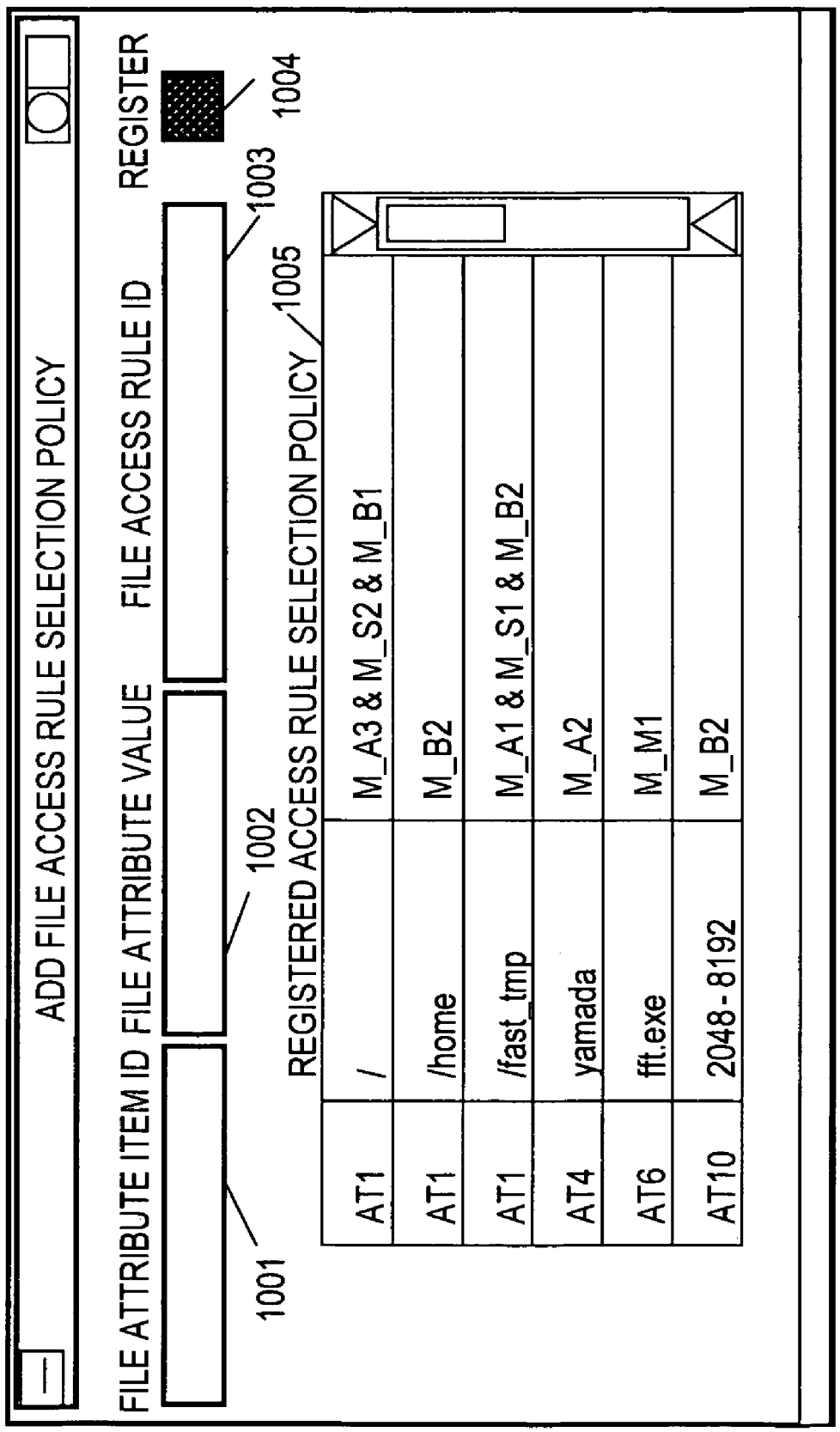
FIG. 10 is an explanatory diagram of an example of a GUI through which file access rule selection policies are set to the file access rule selection policy table in the embodiment of this invention.

The file access rule selection policy table 400 is, as shown in FIGS. 8 to 10, a table showing the association between the file attribute 600 and a file access rule to be applied to the file 700 that has the file attribute 600.

Figure 13:
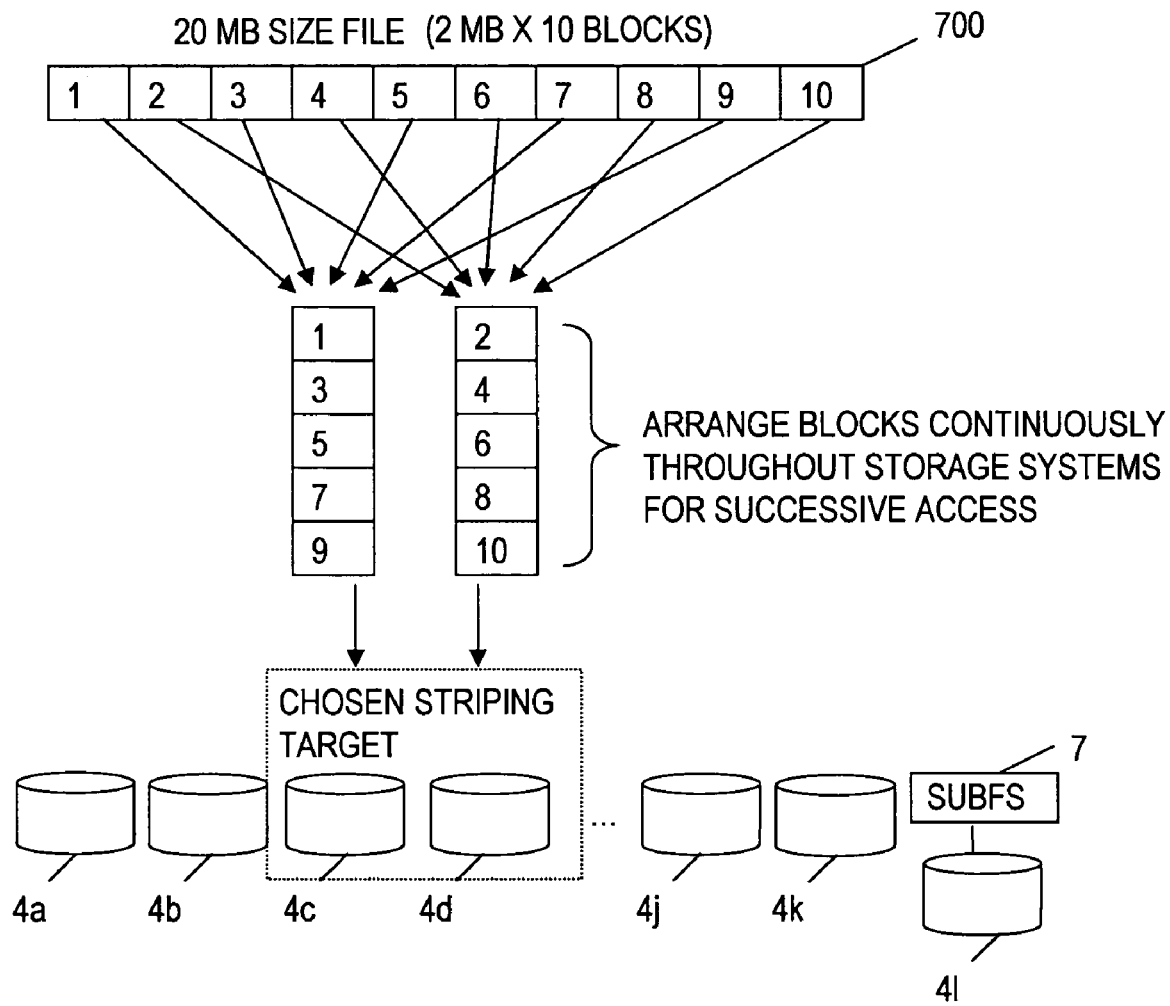
FIG. 13 is an explanatory diagram of an example in which a file is accessed under the combined file access rule according to the embodiment of this invention.

The combined file access rule 1000 is a rule actually applied upon access to the file 700 as shown in FIGS. 12 and 13. The combined file access rule 1000 is created by combining file access rules that are associated with the file attribute 600 of the file 700 as defined in the file access rule selection policy table 400.

The file access rule selection control module 200 may apply, instead of rules in the file access rule table 300 and policies in the file access rule selection policy table 400, a file access rule and a file access rule selection policy that are defined in the environment variable/setting file 18 by the user.

The I/O nodes 2a to 2e are computer devices to process data access from the client nodes 1 to the storage devices 4k to 4i, and have a hardware configuration similar to that of the client nodes 1. When the client nodes 1 issue a command for data input/output to and from the storage devices 4 connected to the I/O nodes 2, the command is transferred to the node that is connected to the target storage devices 4, and input/output is executed. The I/O nodes 2a to 2e are not directly used by the user and therefore may not have the user command/application 5. Managed by the file systems 6 of the client nodes 1, none of the I/O nodes 2a to 2e file systems 6.

The I/O nodes 2a to 2e may have sub file systems to manage the storage devices directly connected to the I/O nodes. In this embodiment, the I/O node 2a has the sub file system (SUBFS) 7, which manages file access to the storage devices 4k and 4l upon reception of a file access command from the file systems 6 of the client nodes 1.

The storage devices 4a to 4l are each a volume (logical unit) deemed by an operating system (omitted from the drawing) as a single disk drive. Each of the storage devices 4a to 4l may be a singular disk drive (magnetic disk drive, for example), or an aggregation of plural disk drives (e.g., a magnetic disk array such as RAID), or a part of a single disk drive or a part of plural disk drives.

In this embodiment, the storage devices 4a to 4j are directly managed by the file systems 6a and 6b whereas the storage devices 4k and 4l are managed through the sub file system 7. Instead, the file systems 6a and 6b may directly manage all of the storage devices. Alternatively, the I/O nodes 2 may all have sub file systems (not shown in a drawing) similar to the sub file system 7 so that all the storage devices are managed through the sub file systems.

The file systems 6 may be placed in the I/O nodes 2 instead of the client nodes 1. In this case, the user command/application 5 in each of the client nodes 1 issues, via the network 3, a file access command to the file systems 6 in the I/O nodes 2, and the file systems 6 in the I/O nodes 2 manage file access to the storage devices 4.

It is also possible to distribute the file systems 6 between the client nodes 1 and the I/O nodes 2.

Another option is to provide the computer system with a client device that has no file systems 6 (not shown in a drawing) in addition to the client nodes 1 that have the file systems 6. The client device is connected to the network 3 and requests, via the network 3, the file systems 6 to grant file access. In this case, one of the file systems 6 that has received a file access request from the client device manages file access to the storage devices 4.

A detailed description will be given below on the file system 6a and the user command/application 5 which operate in the client node 1a. The user command/application 5 in the client node 2b operate the same way as the user command/application 5 in the client node 2a, since the file system 6b in the client node 2b and the file system 6a together provide one file system function.

Figure 2:
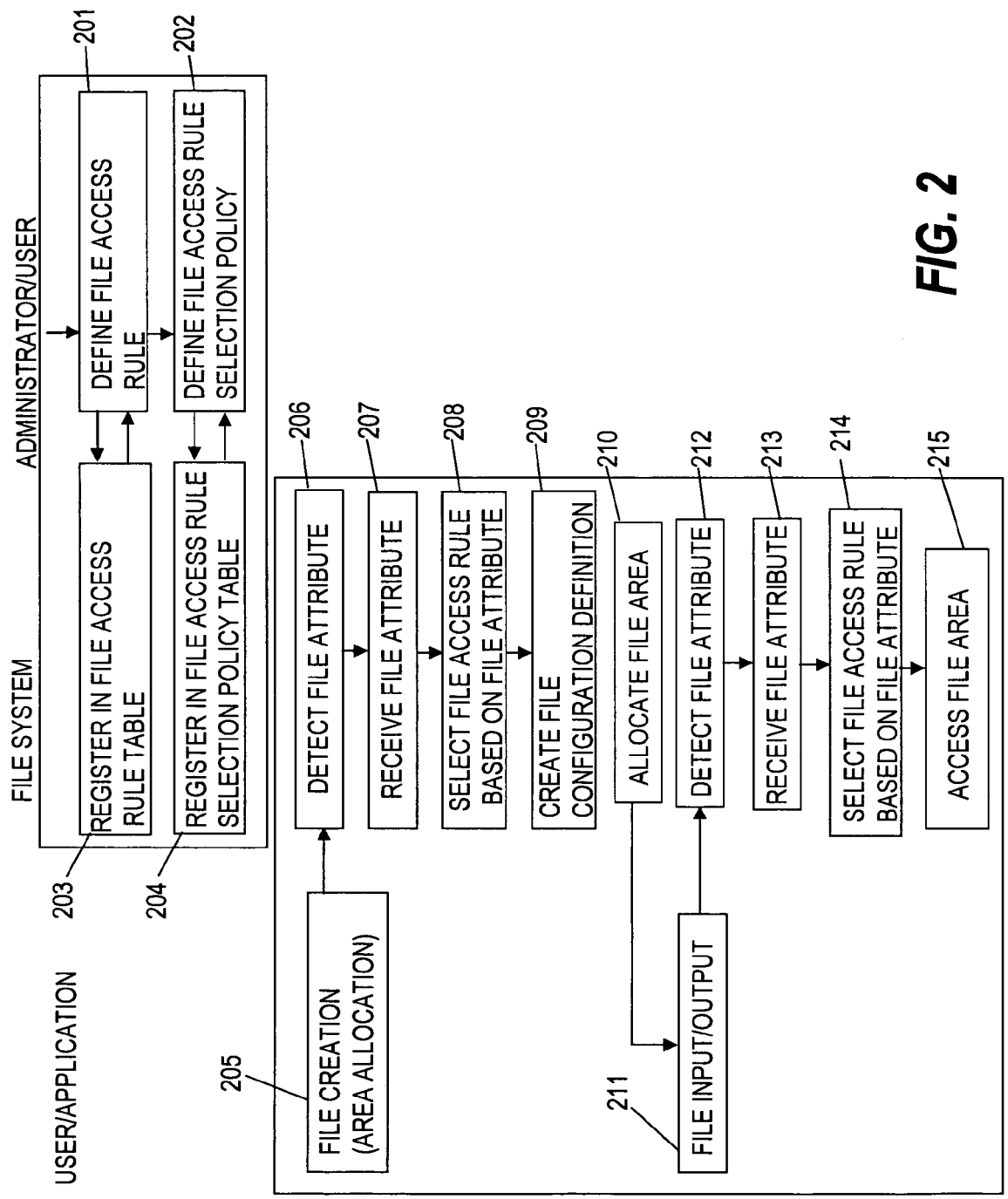
FIG. 2 is an explanatory diagram of steps of file input/output processing according to the embodiment of this invention.

FIG. 2 is an explanatory diagram of steps of file input/output processing according to the embodiment of this invention.

The file input/output processing is composed of a step in which file access rules and file access rule selection policies are defined by the administrator or the user, a step in which a file is created with the user command/application 5, and a step in which file input/output is executed by the user command/ application 5.

Now, processing conducted in the respective steps will be outlined.

The administrator or the user defines file allocation rules, or file access rules by which a file access method is designated, and file access rule selection policies for selecting a file access rule that is suitable to the objective file from among plural file access rules (steps 201 and 202). The administrator or the user then uses a graphical user interface (GUI), a system call, the environment variable or the setting file to notify the file system 6a of the defined file access rules and file access rule selection policies (steps 203 and 204).

When the user creates the file 700 (a step 205), the file attribute detecting module 500 detects the file attribute 600 of the file 700 (a step 206) and sends the detected file attribute 600 to the file access control module 100 (a step 207).

The file access control module 100 deliver the received file attribute 600 to the file access rule selection control module 200. The file access rule selection control module 200 applies the file access rule table 300 and the file access rule selection policy table 400 to the file attribute 600 to thereby create the combined file access rule 1000 (a step 208). In this step, the environment variable/setting file 18 set by the user may be employed.

The file access control module 100 uses the combined file access rule 1000 to create the file configuration definition 800 and the file 700 (steps 209 and 210).

When the user accesses the file 700 for data input/output (a step 211), the file attribute detecting module 500 detects the file attribute 600 of the file 700 (a step 212) and sends the detected file attribute 600 to the file access control module 100 (a step 213).

The file access control module 100 deliver the received file attribute 600 to the file access rule selection control module 200. The file access rule selection control module 200 applies the file access rule table 300 and the file access rule selection policy table 400 to the file attribute 600 to thereby create the combined file access rule 1000 (a step 214). The environment variable/setting file 18 set by the user may be employed.

The file access control module 100 uses the combined file access rule 1000 to execute file input/output (a step 215).

Described next in detail are file access rules and the file access rule table 300.

File access rules are rules by which a method of allocating a file to the storage devices 4 or a file access method is designated. File allocation methods are rules applied in creating a file, and are sorted into such types as storage area allocation, striping method, and block size.

FIG. 3 is an explanatory diagram of the file access rule table 300 according to the embodiment of this invention.

In FIG. 3, a rule type 301 indicates the type of a file access rule defined in the file access rule table 300. In the example of FIG. 3, file access rules are classified into four types, "storage area allocation", "striping method", "block size" and "access method".

A file access rule ID 302 is an identifier unique to each file access rule defined in the file access rule table 300.

A field of a file access rule 303 holds contents of a file access rule defined in the file access rule table 300.

Each of the four types of file access rule 303 is described next.

The file access rule 303 whose rule type 301 is "storage area allocation" specifies to which of the storage devices 4a to 4j and the sub file system 7 the file 700 is allocated. Here, the storage devices 4 and the sub file system 7 are each regarded as a storage area.

More than one storage areas can be designated as areas to which the file 700 is allocated. In the example of FIG. 3, the file access rule 303 whose file access rule ID 302 is "M_A1", the file access rule 303 whose file access rule ID 302 is "M_A2", and the file access rule 303 whose file access rule ID 302 is "M_A3" are classified as type "storage area allocation".

The file access rule "M_A1" is defined as "range=4*b*-4*d*" (Row 304). This means that the storage devices 4b, 4c and 4d are designated as storage areas to which the file 700 is allocated. The administrator or the user can designate an arbitrary storage area by changing the parameter "4*b*-4*d*".

The file access rule "M_A2" is defined as "width=2" (Row 305). This means that the file 700 is allocated to two storage areas. To which two of the storage areas the file 700 is allocated cannot be specified by the file access rule "M_A2", but is up to the file systems 6. The administrator or the user can specify how many storage areas are to be designated by changing the parameter "2" to a desired number.

The file access rule "M_A3" is defined as "range=−1" (Row 306). This means that the file 700 is allocated to every storage area.

The file access rule table 300 can store rules that contradict one another such as the file access rules "M_A1", "M_A2", and "M_A3".

The administrator or the user can enter arbitrary rules having different parameters in addition to the file access rules "M_A1", "M_A2", and "M_A3". A storage area can be designated by other methods than those mentioned above, which are by "range" and by "width".

The file access rule 303 whose rule type 301 is "striping method" specifies an allocation unit employed in distributing the file 700 among designated storage areas. In the example of FIG. 3, the file access rule 303 whose file access rule ID 302 is "M_S1" and the file access rule 303 whose file access rule ID 302 is "M_S2" are classified as type "striping method".

The file access rule "M_S1" is defined as "stripe=block" (Row 307). This means that block striping is chosen. To elaborate, the file 700 is divided into blocks of a given size, and the obtained blocks are allocated to and distributed among storage areas designated by the file access rule 303 that is classified as type "storage area allocation". Employing block striping makes parallel operation of plural storage areas possible in accessing one file and thereby improves the performance of accessing a single file.

The file access rule "M_S2" is defined as "stripe=file" (Row 308). This means that file striping is chosen. To elaborate, in the case where there is more than one file 700, the files 700 are allocated to and distributed among storage areas designated by the file access rule 303 that is classified as type "storage area allocation". As a result, one file 700 is allocated to one storage area. For instance, when there are n (n is an arbitrary integer) storage areas and n files are created, each storage area has one file 700 allocated thereto. File striping provides better access performance than block striping when the number of files accessed simultaneously is larger than the total number of storage areas.

The file access rule 303 whose rule type 301 is "block size" specifies a block size for when block striping is employed. In the example of FIG. 3, the file access rule 303 whose file access rule ID 302 is "M_B1" and the file access rule 303 whose file access rule ID 302 is "M_B2" are classified as type "block size".

The file access rule "M_B1" is defined as "blocksize=512" (Row 309). This means that 512 KB is designated as the block size.

The file access rule "M_B2" is defined as "blocksize=2048" (Row 310). This means that 2048 KB (=2 MB) is designated as the block size.

The administrator or the user can enter a rule that specifies an arbitrary block size in addition to the file access rules "M_B1" and "M_B2". By choosing a block size suitable for the characteristics of an application that uses the file 700 or the size of the file 700, the administrator or the user can enhance the parallelism of plural storage areas and the performance efficiency of a single storage area.

The file access rule 303 whose rule type 301 is "access method" is a rule concerning input/output in the file 700 (file access). In the example of FIG. 3, the file access rule 303 whose file access rule ID 302 is "M_M1", the file access rule 303 whose file access rule ID 302 is "M_M2", the file access rule 303 whose file access rule ID 302 is "M_M3", and the file access rule 303 whose file access rule ID 302 is "M_A4" are classified as type "access method".

The file access rule "M_M1" is defined as "access=sequential" (Row 311). This means that sequential access is designated as the access method. When sequential access is chosen, continuous blocks of the file 700 are successively recorded in storage areas in most cases. Therefore, issuing input/output commands in groups improves the access performance.

The file access rule "M_M2" is defined as "access=random" (Row 312). This means that random access is designated as the access method.

The file access rule "M_M3" is defined as "file_cache=true" (Row 313). This means that file caching is performed when accessing the file 700.

The file access rule "M_M4" is defined as "file_pre_read=true" (Row 314). This means that file pre-reading takes place prior to accessing the file 700.

Normally, file caching and file pre-reading improve the access performance. However, when a file to be accessed is huge or partitioned into pieces and dispersed thinly, the access performance is improved only little by file caching and file pre-reading. In such cases, file caching and file pre-reading are omitted to reduce the processing quantity and prevent the access performance from lowering.

The administrator or the user can enter an arbitrary rule concerning file access in addition to the file access rules "M_M1" to "M_M4". The administrator or the user can improve the access performance by choosing a rule concerning file access that is appropriate to the file to be accessed.

The administrator or the user can also enter other types of file access rule 303 than those classified as type "storage area allocation", "striping method", "block size" and "access method" in the file access rule table 300.

As described above, the file access rule table 300 stores combinations of the file access rule ID 302 and the file access rule 303.

FIG. 4 is a flow chart showing steps employed by the administrator or the user in the embodiment of this invention to set file access rules to the file access rule table 300.

The administrator or the user uses a GUI, a system call, the environment variable or the setting file to set the file access rule 303 to the file access rule table 300.

As the setting processing is started (a step 401), the administrator or the user determines the contents of the file access rule 303 to be set, and sends the contents to the file access rule selection control module 200 through a GUI, a system call, the environment variable or the setting file (a step 402).

The file access rule selection control module 200 registers the received contents in the file access rule table 300 (a step 403), and ends the processing (a step 404).

FIG. 5 is an explanatory diagram of an example of a GUI through which the administrator or the user sets the file access rule 303 to the file access rule table 300 in the embodiment of this invention.

The administrator or the user operates the client nodes 1 to set the file access rule 303 to the file access rule table 300. During this setting operation, a window shown in FIG. 5 is displayed on an input/output device (omitted from the drawing) that each of the client nodes 1 has.

The window shows a file access rule ID entering field 501, a file access rule entering field 502, a register button 503, and a registered access rule displaying field 504. The administrator or the user enters, in the file access rule ID entering field 501, the file access rule ID 302 given to the file access rule 303 that is to be set and enters, in the file access rule entering field 502, the file access rule 303 that is to be set.

The administrator or the user then operates the register button 503 (by, for example, placing a mouse cursor on the register button 503 and clicking on the button) to register the entered combination of the ID and the rule. A list of the file access rule ID 302 and the file access rule 303 that have been registered is displayed in the registered access rule displaying field 504. In the example of FIG. 5, the file access rule ID 302 and file access rule 303 of FIG. 3 are registered and displayed in the list.

The file attribute 600 is described next.

FIG. 6 is an explanatory diagram of the contents of the file attribute 600 according to the embodiment of this invention.

In FIG. 6, an attribute type 603 indicates the type of the file attribute 600 detected by the file attribute detecting module 500 about the file 700. In the example of FIG. 6, there are two types of file attribute 600, "static file attribute" 601 and "dynamic file attribute" 602. The static file attribute 601 is an attribute determined upon creation of the file, and can be a file name, a file size and the like. The dynamic file attribute 602 is an attribute determined each time the file is accessed, and can be the name of a program that accesses the file, the name of a user who accesses the file, and the like.

A file attribute item ID 604 is an identifier unique to each file attribute item.

An attribute priority 605 is a value representing a priority level that is given to a file attribute item. In general, one file has plural file attributes 600. When contradicting file access rules 303 are associated with the file attributes 600 that the file has, the rule that is associated with the highest priority file attribute item is chosen and applied. In the example of FIG. 6, a larger value of the attribute priority 605 represents a higher priority level. Details of what file attribute 600 is associated with which file access rule 303 will be described with reference to FIG. 8. Details of how the attribute priority 605 is used in selecting the file access rule 303 will be described with reference to FIG. 12.

A file attribute item 606 indicates a file attribute item associated with the file attribute item ID 604. An attribute corresponding to the file attribute item 606 is the file attribute 600.

In the example of FIG. 6, the file attribute item 606 that is associated with a file attribute item ID "AT1." is "the name of the directory to which the file belongs", has "1" as the attribute priority 605, and is classified as a "static file attribute" by the attribute type 603 (Row 607). When the file is under a root directory, for example, the file attribute 600 that corresponds to the file attribute item "the name of the directory to which the file belongs" is "/" (which represents a root directory).

Similarly, a file attribute item ID "AT2" is associated with a file attribute item "file name" and an attribute priority "2", and the file attribute item identified by "AT2" is classified as a "static file attribute" (Row 608).

A file attribute item ID "AT3" is associated with a file attribute item "file size" and an attribute priority "3", and the file attribute item identified by "AT3" is classified as a "static file attribute" (Row 609).

A file attribute item ID "AT4" is associated with a file attribute item "file owner name" (the name of one who possesses the file) and an attribute priority "4", and the file attribute item identified by "AT4" is classified as a "static file attribute" (Row 610).

A file attribute item ID "AT5" is associated with a file attribute item "file owner ID" (the identifier unique to the owner of the file) and an attribute priority "5", and the file attribute item identified by "AT5" is classified as a "static file attribute" (Row 611).

"File creator user name" (the name of the user who has created the file) may be included as one of file attribute items that are classified as "static file attributes".

A file attribute item ID "AT6" is associated with a file attribute item "file access program name" and an attribute priority "6", and the file attribute item identified by "AT6" is classified as a "dynamic file attribute" (Row 612).

A file attribute item ID "AT7" is associated with a file attribute item "file access process ID" and an attribute priority "7", and the file attribute item identified by "AT7" is classified as a "dynamic file attribute" (Row 613).

A file attribute item ID "AT8" is associated with a file attribute item "file access user name" (the name of a user who accesses the file) and an attribute priority "8", and the file attribute item identified by "AT8" is classified as a "dynamic file attribute" (Row 614).

A file attribute item ID "AT9" is associated with a file attribute item "file access user ID" (an identifier unique to a user who accesses the file) and an attribute priority "9", and the file attribute item identified by "AT9" is classified as a "dynamic file attribute" (Row 615).

A file attribute item ID "AT10" is associated with a file attribute item "file access unit" and an attribute priority "10", and the file attribute item identified by "AT10" is classified as a "dynamic file attribute" (Row 616).

The file attribute detecting module 500 detects file attributes for each file attribute item 606. The administrator or the user can add other file attribute item 606 than those shown in FIG. 6 and set values to the file attribute item ID 604 and the attribute priority 605 for the added item.

FIG. 7 is an explanatory diagram of examples of the file attribute 600 detected by the file attribute detecting module 500 according to the embodiment of this invention.

FIG. 7 shows attributes of a file "fft.dat", which is created in a directory "/fast_tmp" by a program "fft.exe" and which is owned by "yamada".

A file attribute item ID 701 corresponds to the file attribute item ID 604 that is associated with the file attribute item 606 of the file "fft.dat", which is detected by the file attribute detecting module 500. Shown between parentheses in FIG. 7 is the file attribute item 606 that is associated with each file attribute item ID 604.

A file attribute value 702 indicates the value of the file attribute 600 of the file "fft.dat", which is detected by the file attribute detecting module 500. In the example of FIG. 7, a file attribute value "/(root directory)" (Row 703) and a file attribute value "fast_tmp" (Row 704) are detected for the file attribute item "the name of the directory to which the file belongs". A file attribute value "yamada" is detected for the file attribute item "file owner name", and a file attribute value "fft.exe" is detected for the file attribute item "file access program name". A combination of the file attribute value 702 and its associated file attribute item ID 701 is the file attribute 600 that is detected about the file "fft.dat".

FIG. 7 shows for the purpose of explanation a case in which the file attribute detecting module 500 detects the file attribute value 702 for only three file attribute items, "the name of the directory to which the file belongs", "file owner name" and "file access program name". In practice, the file attribute detecting module 500 can detect the file attribute value 702 for other file attribute items ("file name", for example).

Described next in detail are file access rule selection policies and the file access rule selection policy table 400.

FIG. 8 is an explanatory diagram of the file access rule selection policy table 400 according to the embodiment of this invention.

A file access rule selection policy is for determining which file attribute 606 is associated with what file access rule. The file access rule selection policy table 400 stores the contents of a file access rule policy for each file attribute 600.

In FIG. 8, a file attribute item ID 801 is the identifier of an item of the file attribute 600 that is associated with a file access rule by the file access rule selection policy table 400, and corresponds to the file attribute item ID 604 of FIG. 6 and the file attribute item ID 701 of FIG. 7. Shown between parentheses in FIG. 8 is the file attribute item 606 that is associated with each file attribute item ID 604.

A file attribute value 802 indicates the value of the file attribute 600 that is associated with a file access rule by the file access rule selection policy table 400, and corresponds to the file attribute value 702 of FIG. 7.

A file access rule ID 803 indicates a file access rule associated with the file attribute 600 by the file access rule selection policy table 400. The file access rule ID 803 is an identifier or a combination of identifiers shown in FIG. 3 as the file access rule ID 302.

The file attribute item ID 801 and its associated file attribute value 802 and file access rule ID 803 together make a file access rule selection policy defined in the file access rule selection policy table 400.

In the example of FIG. 8, the file access rule IDs "M_A3", "M_S2", "M_B1", "M_M2", "M_M3", and "M_M4" are associated with the file attribute value "/" of the file attribute item ID "AT1 (the name of the directory to which the file belongs)" (Row 804). This means that, for the file 700 that belongs to a directory "/(root directory)", file striping targeting all storage areas is designated as the striping method, 512 KB as the block size, and random access as the access method, and that execution of file caching and file pre-reading upon access is chosen as shown in FIG. 3.

Similarly, 2 MB is designated as the block size for the file 700 that belongs to a directory "/home" (Row 805). For the file 700 that belongs to a directory "/fast_tmp", block striping targeting the storage devices 4*b*, 4*c*, and 4*d* is designated as the striping method, 2 MB as the block size, and sequential access as the access method, and execution of file pre-reading alone upon access is chosen (Row 806). For the file 700 that has the file owner name "yamada", two arbitrary storage areas are designated as areas to which the file 700 is allocated (Row 807). For the file 700 that has the file access program name "fft.exe", sequential access is designated as the file access method (Row 808). For the file 700 that has a file access unit ranging from 2048 KB to 8192 KB, 2 MB is designated as the block size (Row 809).

As shown in FIG. 8, the file access rule selection policy table 400 can store plural file access rule selection policies.

FIG. 9 is a flow chart of steps employed by the administrator or the user in the embodiment of this invention to set file access rule selection policies to the file access rule selection policy table 400.

The administrator or the user uses a GUI, a system call, the environment variable or the setting file to set access rule selection policies to the file access rule selection policy table 400.

As the setting processing is started (a step 901), the administrator or the user determines the contents of a file access rule selection policy to be set, and sends the contents to the file access rule selection control module 200 through a GUI, a system call, the environment variable or the setting file (a step 902).

The file access rule selection control module 200 registers the received contents in the file access rule selection policy table 400 (a step 903), and ends the processing (a step 904).

FIG. 10 is an explanatory diagram of an example of a GUI through which the administrator or the user sets file access rule selection policies to the file access rule selection policy table 400 in the embodiment of this invention.

The administrator or the user operates the client nodes 1 to set file access rule selection policies to the file access rule selection policy table 400. During this setting operation, a window shown in FIG. 10 is displayed on the input/output device (omitted from the drawing) of the client nodes 1.

The window shows a file attribute item ID entering field 1001, a file attribute value entering field 1002, a file access rule ID entering field 1003, a register button 1004, and a registered file access rule selection policy displaying field 1005.

The administrator or the user enters, in the file attribute item ID entering field 1001, the file attribute item ID 801 that is to be set, enters, in the file attribute value entering field 1002, the file attribute value 802 that is to be set, and enters, in the file access rule ID entering field 1003, the file access rule ID 803 that is to be set.

The administrator or the user then operates the register button 1004 (by, for example, placing a mouse cursor on the register button 1004 and clicking on the button) to register the entered combination of the file attribute item ID 801, the file attribute value 802 and the file access rule ID 803 (in other words, a file access rule selection policy) to the file access rule selection policy table 400. A list of file access rule selection policies that have been registered is displayed in the registered file access rule selection policy displaying field 1005. In the example of FIG. 10, the file access rule selection policies of FIG. 8 are registered and displayed in the list.

According to the above file access rules and file access rule selection policies, a file access rule can be set in advance in association with the file attribute 600, which is the name of the directory to which the file belongs, a file owner name, or the like. This makes it possible to apply an optimum file access rule without needing the user to set an allocation method and an access method for each file 700. Also, the administrator or the user can add new file access rules and file access rule selection policies and delete or change those already set, and thus can access a file under optimum conditions by designating a temporary file access rule and file access rule selection policy upon execution of an application or a job, or other occasions.

Figure 11:
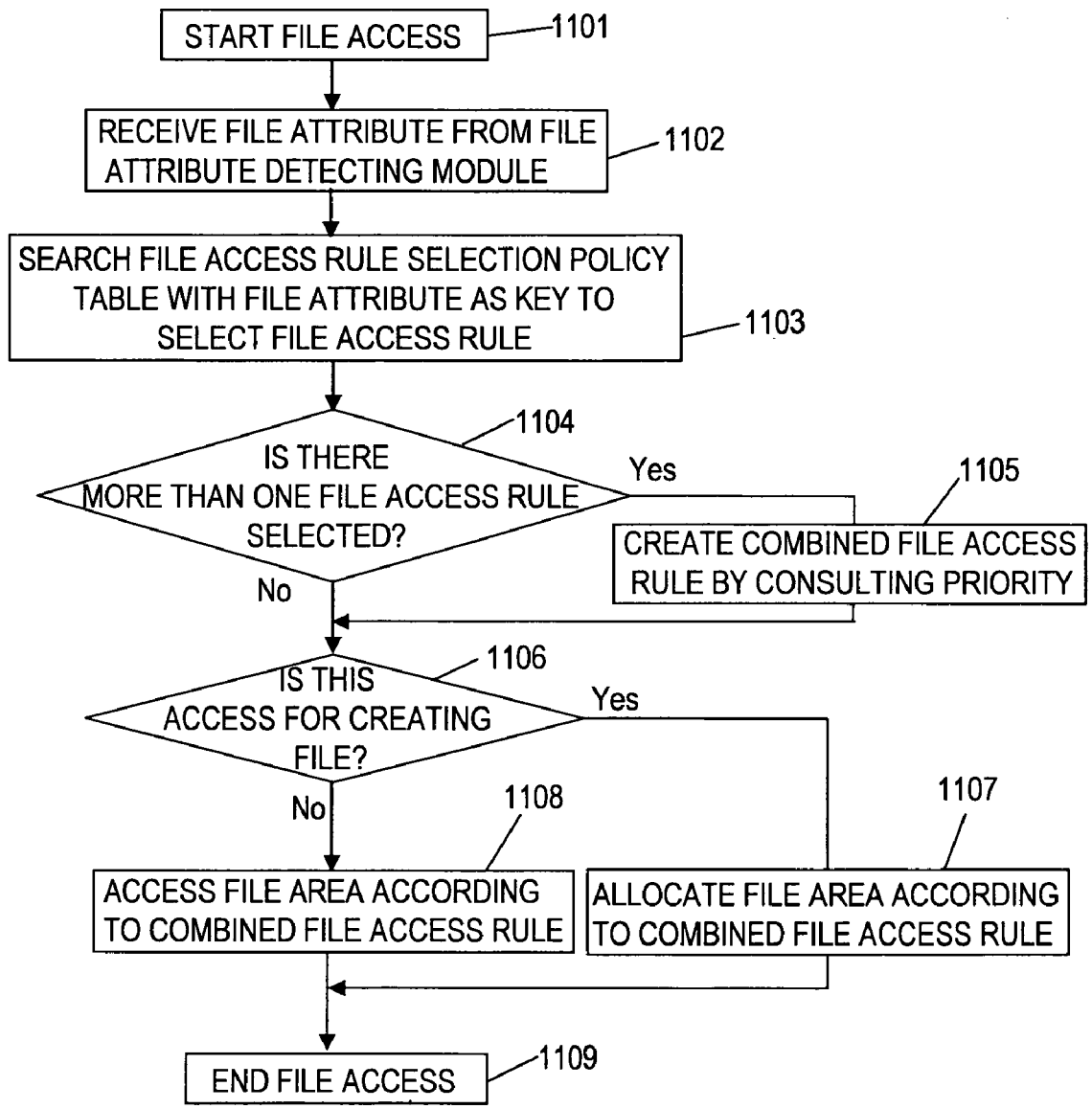
FIG. 11 is a flow chart illustrating steps of file access processing which is executed by a file system according to the embodiment of this invention.

FIG. 11 is a flow chart illustrating steps of file access processing which is executed by the file systems 6 according to the embodiment of this invention.

As the user starts processing of accessing the file 700 (including processing of creating the file 700) (a step 1101), the file access control module 100 in the file systems 6 receives, from the file attribute detecting module 500, the file attribute 600 of the file 700 (a step 1102). The received file attribute 600 is detected by the file attribute detecting module 500.

The file access control module 100 deliver the file attribute 600 to the file access rule selection control module 200. The file access rule selection control module 200 applies the file access rule table 300 and the file access rule selection policy table 400 to the file attribute 600 to thereby select the file access rule 303 that is matched up with the received file attribute 600 (a step 1103). In this step, the environment variable/setting file 18 set by the user may be employed.

Then it is judged whether plural file access rule selection policies are applied in the step 1103 by using the file access rule selection policy table 400 (a step 1104). When plural file access rule selection policies are applied, there is a chance of the file access rules 303 that contradict one another being selected. Thus the combined file access rule 1000 (a file access rule that is actually applied to file access) is created with the use of the attribute priority 605 (a step 1105). The processing then proceeds to a step 1106. Details of creation of the combined file access rule 1000 will be described with reference to FIG. 12.

When only one file access rule selection policy is applied in the step 1103, on the other hand, there is no chance of the file access rules 303 that contradict one another being selected. Accordingly, the selected file access rule 303 serves as the combined file access rule 1000.

Next, whether the access processing started in the step 1101 is for creating the file 700 (a step 1106). When it is judged as a result the access processing is for creating the file 700, the combined file access rule 1000 is applied to determine to which storage area the file 700 is allocated, and the file 700 is stored in the selected storage area (a step 1107).

On the other hand, when the access processing is determined as other processing than creation of the file 700, the combined file access rule 1000 is applied to access the file 700 stored in a storage area (a step 1108). These two types of access will be described in detail with reference to FIG. 13.

FIG. 12 is an explanatory diagram of how the combined file access rule 1000 is created according to the embodiment of this invention.

FIG. 12 illustrates the processing in the step 1105 of FIG. 11.

The combined file access rule 1000 created in FIG. 12 as an example is for the file "fft.dat", which is created in the directory "/fast_tmp" by the program "fft.exe" and which is owned by "yamada" as in FIG. 7.

A file attribute item ID 1202 and a file attribute value 1203 in FIG. 12 are equal to the file attribute item ID 701 and the file attribute value 702 in FIG. 7, respectively.

A file access rule ID 1204 indicates a rule or rules selected in the step 1103 of FIG. 11, and is selected by referring to the file attribute value 1203 and the file access rule selection policy table 400 of FIG. 8.

A priority 1201 is equal to the attribute priority 605 of FIG. 6 which is associated with the file attribute item ID 1202, and a larger value of the priority 1201 represents a higher priority level. This example has two items of which the file attribute item ID 1202 is "AT1" (the file attribute item "the name of the directory to which the file belongs"). In the case where the file access rule 303 is assigned for each directory hierarchy as in this example, an item of the lower directory is given a higher priority than an item of the higher directory.

When the file access rules 303 that are associated with plural file attribute values are selected as in this example, every selected file access rule 303 is applied in principle. The exception is when the file access rules 303 that are contradicting to one another are selected. In this case, the file access rule 303 that is associated with a file attribute value having the highest priority 1201 is applied.

For instance, of file access rules shown in the field of the file access rule ID 1204 of FIG. 12, the file access rule "M_A3" (the file is allocated to all the storage areas) in Row 1205, the file access rule "M_A1" (which allocates the file to the storage areas 4b, 4c, and 4d) in Row 1206, and the file access rule "M_A2" (which allocates the file to two arbitrary storage areas) in Row 1207 contradict one another. The file access rule "M_A2", which has the highest priority 1201 of the three, is applied in this case.

The combined file access rule 1000 thus created is shown in Row 1209 of FIG. 12. In this example, block striping (M_S1) to allocate blocks each having a size of 2 MB (M_B2) to two arbitrary storage areas (M_A2) is designated and sequential access (M_M1) with file caching (M_M3) and file pre-reading (M_M4) in effect is designated as the access method.

FIG. 13 is an explanatory diagram of an example in which the file 700 is accessed under the combined file access rule 1000 according to the embodiment of this invention.

In this example, the combined file access rule 1000 that is shown in Row 1209 of FIG. 12 is applied to access to the file "fft.dat" of FIG. 12. The size of the file 700 (the file "fft.dat") here is 20 MB.

First, "M_A2" of the combined file access rule 1000 is followed and two arbitrary storage areas are selected. In the example of FIG. 13, the storage devices 4c and 4d are chosen.

Next, "M_B2" is followed and the file 700 is divided into ten blocks each having a size of 2 MB.

"M_S1" is followed next to disperse the obtained 10 blocks between the storage devices 4c and 4d by allocating the blocks alternately to the two storage devices starting from the head block. As a result, the first, third, fifth, seventh and ninth blocks counted from the head are allocated to the storage device 4c whereas the second, fourth, sixth, eighth and tenth blocks are allocated to the storage device 4d.

Next, "M_M1" is followed and the blocks are allocated to continuous areas of the storage devices 4c and 4d. "M_M3" and "M_M4" are followed to access the file while employing file caching and file pre-reading. Applying file caching and file pre-reading to the blocks allocated to the continuous areas makes the read-ahead/collective write function work effectively upon file access, and thus improves the access performance.

In addition, since storage areas to which the blocks are striped are limited to the two storage devices 4c and 4d in the example of FIG. 13, the probability of competition for the storage devices 4 in the case where another file is accessed simultaneously can be kept low.

It is also possible to set a rule for creating another file 700 through file striping. In this case, the file 700 to which file striping is applied and the file 700 to which block striping is applied are both created in one of the file systems 6 and accessed.

As has been described, the file access control method of this invention makes it possible, by setting in advance a file access rule in association with a directory name, a file owner name or the like, to apply a file access rule that is optimum to the file to be accessed without needing the user to set a file allocation method and an access rule for each file. As a result, high-speed file access is obtained without sacrificing user-friendliness.

In addition, this invention allows the administrator or the user to add new file access rules and file access rule selection policies, delete or change those already set, and thus access a file under optimum conditions by designating a temporary file access rule and file access rule selection policy upon, for example, execution of an application or a job.

Furthermore, since a file created by file striping and a file created by block striping can be created and accessed in one file system, this invention increases the flexibility in running the system.

The configuration of the file systems 6 of the embodiment of this invention is merely an example and this invention is applicable to various file systems that are different from those of the embodiment of this invention. This invention does not limit the hardware configuration including the number of nodes, the network type, the storage device type, and the number of storage devices. The gist of this invention is in selecting an optimum file access method with the use of a file access rule selection policy set by a user while saving the user from the trouble of setting a file access method for each file.

This invention is applicable to a file system that manages plural storage devices, and contributes to improvement in file access performance and user-friendliness of the file system.

What is claimed is:

1. A storage system comprising:

a node; and a plurality of storage devices coupled to the node, said storage devices store data of files, wherein the node includes:

a file attribute detecting module that detects file attributes of a plurality of file attribute items from a file that is to be allocated, a file allocation rule information storing unit that stores a plurality of file allocation rules which are selectively applied for allocating files to the storage devices, a file allocation rule selection policy storing unit that stores, for each of file attributes that is detected by the file attribute detecting module, at least a file allocation rule identifier identifying a file allocation rule that is to be applied in a process for allocating a file having the corresponding file attribute, and a file allocation control module that determines where said file to be allocated is to be stored in the storage devices, wherein said file attribute item that is detected by the file attribute detecting module are ranked into priority levels, and wherein said file allocation control module determines where said file to be allocated is to be stored, by extracting file allocation rule identifiers respectively corresponding to each of the file attributes that are detected by the file attribute detecting module, if the extracted file allocation rule identifiers includes a combination of file allocation rule identifiers contradicting one another, then selecting a file allocation rule identifier corresponding to a file attribute item ranked to a highest priority among the contradicting file allocation rule identifiers, and creating an actual file allocation rule composed of file allocation rules identified by not contradicting file allocation rule identifiers among the extracted file allocation rule identifiers and the selected file allocation rule identifier.

2. The storage system according to claim 1, wherein the file attributes include static file attributes and/or dynamic file attributes,
   wherein the static file attributes include at least one of a name of a directory to which the file belongs, a name of the file, a size of the file, a name of a user who possesses the file, and a name of a user who has created the file, and
   wherein the dynamic file attributes include at least one of a name of a program that accesses the file, an identifier of a process of accessing the file, a name of a user who accesses the file, a type of access to the file, and a unit of access to the file.

3. The storage system according to claim 1, wherein the file allocation rules include, at least, a storage device allocation rule that determines to which storage device a file to be accessed is allocated, a striping rule that determines how the file is striped, a block size rule that determines the block size, and an allocation rule that determines how the file is accessed.

4. The storage system according to claim 1, wherein the information is added to the file allocation rule information storing unit through a graphical user interface, a system call, an environment variable or a setting file.

5. A file allocation control method in a node coupled to a plurality of storage devices storing data of files, the method comprising the steps of:
   storing in a first table a plurality of file allocation rules which are selectively applied for allocating files to the storage devices;
   storing in a second table, for each of file attributes of a plurality of file attribute items, at least a file allocation rule identifier identifying a file allocation rule that is to be applied in a process for allocating a file having the corresponding file attribute, wherein the file attribute items are ranked into priority levels;
   detecting a plurality of file attributes of a file that is to be allocated;
   extracting file allocation rule identifiers respectively corresponding to each of the file attributes that are detected by the file attribute detecting module;
   if the extracted file allocation rule identifiers includes a combination of file allocation rule identifiers contradicting one another, selecting a file allocation rule identifier corresponding to a file attribute item ranked to a highest priority among the contradicting file allocation rule identifiers; and
   creating an actual file allocation rule composed of file allocation rules identified by not contradicting file allocation rule identifiers among the extracted file allocation rule identifiers and the selected file allocation rule identifier.

6. The file allocation control method according to claim 5, wherein the file attributes include static file attributes and/or dynamic file attributes,
   wherein the static file attributes include at least one of a name of a directory to which the file belongs, a name of the file, a size of the file, a name of a user who possesses the file, and a name of a user who has created the file, and
   wherein the dynamic file attributes include at least one of a name of a program that accesses the file belongs, an identifier of a process of accessing the file, a name of a user who accesses the file, a type of access to the file, and an unit of access to the file.

7. The file allocation control method according to claim 5, wherein the file allocation rules include, at least, a storage device allocation rule, that determines to which storage device a file to be accessed is allocated, a striping rule, that determines how the file is striped, a block size rule, that determines the block size, and an access rule, that determines how the file is accessed.

8. The file access control method according to claim 5, wherein the file allocation control program further causes the storage system to execute a step of adding the information about file allocation rules through a graphical user interface, a system call, an environment variable or a setting file.

* * * * *